US010011099B2

(12) United States Patent
Takenouchi et al.

(10) Patent No.: US 10,011,099 B2
(45) Date of Patent: Jul. 3, 2018

(54) FILM-FORMING APPARATUS AND FILM-FORMING METHOD

(71) Applicant: 3M INNOVATIVE PROPERTIES COMPANY, St. Paul, MN (US)

(72) Inventors: Takashi Takenouchi, Atsugi (JP); Hideki Serizawa, Shizuoka (JP)

(73) Assignee: 3M Innovative Properties Company, St. Paul, MN (US)

(*) Notice: Subject to any disclaimer, the term of this patent is extended or adjusted under 35 U.S.C. 154(b) by 163 days.

(21) Appl. No.: 15/015,669

(22) Filed: Feb. 4, 2016

(65) Prior Publication Data
US 2016/0151964 A1 Jun. 2, 2016

Related U.S. Application Data

(63) Continuation of application No. 13/881,784, filed as application No. PCT/US2011/057825 on Oct. 26, 2011.

(30) Foreign Application Priority Data

Oct. 29, 2010 (JP) .................................. 2010-244511

(51) Int. Cl.
*B32B 37/10* (2006.01)
*B29C 51/10* (2006.01)
(Continued)

(52) U.S. Cl.
CPC .......... *B32B 37/1009* (2013.01); *B29C 51/10* (2013.01); *B29C 51/16* (2013.01); *B29C 65/02* (2013.01); *B29C 2791/006* (2013.01)

(58) Field of Classification Search
CPC ... B29C 2791/006; B29C 51/10; B29C 51/16; B29C 65/02; B29C 37/1009
(Continued)

(56) References Cited

U.S. PATENT DOCUMENTS 4,608,220 A 8/1986 Caldwell
5,128,090 A 7/1992 Fujii
(Continued)

FOREIGN PATENT DOCUMENTS

DE 31 09 338 9/1982
JP 03150126 A * 6/1991
(Continued)

OTHER PUBLICATIONS

Machine Translation of JP 03150126.*
Abstract of JP 03150126.*

*Primary Examiner* — Christopher T Schatz
(74) *Attorney, Agent, or Firm* — Philip P. Soo (57) ABSTRACT

A film-forming apparatus and method capable of film lamination with superior evenness and good followability regardless of the size, shape and number of articles being laminated. The film-forming apparatus provided has a first chamber that is provided with a heating means and that is capable of maintaining a vacuum or a pressurized state, a second chamber that is disposed so as to be able to be joined to, and separated from, the first chamber, that is provided with a movable supporting table on which an article is supported and that is capable of maintaining a vacuum or a pressurized state, a frame-like film holding member that is disposed between the first chamber and the second chamber and that holds a film, and an auxiliary film pressing tool having a film pressing part that inhibits lifting of the film when the film is laminated on a surface of the article.

17 Claims, 8 Drawing Sheets

(51) Int. Cl.
  *B29C 51/16* (2006.01)
  *B29C 65/02* (2006.01)
(58) Field of Classification Search
  USPC .............................. 156/285, 286, 381, 580
  See application file for complete search history.

(56) References Cited

U.S. PATENT DOCUMENTS

| | | | |
|---|---|---|---|
| 5,913,996 | A | 6/1999 | Ikegame |
| 6,053,027 | A * | 4/2000 | Yoshizawa ................ B30B 1/06 72/442 |
| 6,250,910 | B1 | 6/2001 | Nimmergut |
| 6,860,957 | B2 | 3/2005 | Sana |
| 2005/0000634 | A1 | 1/2005 | Craig |
| 2011/0198021 | A1 | 8/2011 | Meyer |

FOREIGN PATENT DOCUMENTS

| | | |
|---|---|---|
| JP | H03-0150126 A | 6/1991 |
| JP | H05-008362 A | 1/1993 |
| JP | 05-220830 | 8/1993 |
| JP | 06-344433 | 12/1994 |
| JP | 2002-067137 | 3/2002 |
| JP | 2006-224459 | 8/2006 |
| WO | WO 2004/006296 | 1/2004 |
| WO | WO 2010/030883 | 3/2010 |

* cited by examiner

FILM-FORMING APPARATUS AND FILM-FORMING METHOD

This application is a continuation application of pending prior application Ser. No. 13/881,784, filed Apr. 26, 2013, which is a national stage filing under 35 U.S.C. 371 of PCT/US2011/57825, filed Oct. 26, 2011, which claims priority to JP Application No. 2010-244511, filed Oct. 29, 2010, the disclosures of which are incorporated by reference in their entirety herein.

FIELD OF INVENTION

The present invention relates to a film-forming apparatus that laminates a film on a surface of an article such as a three-dimensional component or substrate and also relates to a method for forming a film by using this film-forming apparatus.

BACKGROUND

Attempts have been made to decorate surfaces of three-dimensional components used in exterior and interior components of automobiles and motorcycles, electronic components, furniture, and so on or the surface of articles such as three-dimensional substrates having a complex shape, such as shapes that include protrusions and recesses on the surface, by laminating with a colored (e.g., paint replacement) or designed plastic film instead of using conventional decorations (e.g., liquid paint).

As methods for laminating a film on the surface of this type of article, film lamination forming methods using vacuum forming apparatuses are known. Japanese Unexamined Patent Application Publication No. 2002-67137 describes the constitution of a vacuum forming apparatus and the procedure for a method of laminating a plastic sheet on a core material using this vacuum forming apparatus. As disclosed in the Japanese Unexamined Patent Application Publication No. 2002-67137, vacuum forming apparatuses generally have an upper chamber and a lower chamber able to be joined to and separated from each other, with a heater incorporated into the upper chamber.

In a common lamination method using a vacuum forming apparatus, an article on which a film is to be laminated is supported in the lower chamber and a plastic film that is the formed object is disposed between the upper chamber and the lower chamber. Next, the upper chamber is lowered so that the upper and lower chambers each form an enclosed region with the plastic film, and the conditions inside the upper chamber and the lower chamber are changed from atmospheric pressure to a vacuum state by means of a vacuum pump. Thereafter, the plastic film is softened by being heated by the heater in the upper chamber and air is introduced into the upper chamber only. By creating a pressure difference between the upper chamber and the lower chamber in this way, the plastic film is laminated on the surface of the article in the lower chamber.

SUMMARY OF THE INVENTION

Because film lamination methods using vacuum forming apparatuses are good in terms of the followability of the film to the shape of the surface of the article being laminated, articles on which films are laminated include articles having a wide variety of shapes, such as not only simple cubes and cubic or semi-spherical components, but also ring-shaped and U-shaped components and components having a combination of complex shapes.

However, in cases where the surface of the article to be laminated has protrusions and recesses having large differences in elevation, the film cannot completely follow the shape of the surface, meaning that lifting of the film can occur in some parts.

In addition, it has become desirable in recent years to increase production efficiency by supporting as many articles as possible in one chamber so as to be able to laminate a large number of articles simultaneously. However, when increasing the number of articles in the chamber, it is essential to make the distance between the articles as small as possible, but as this distance becomes smaller, it is common for lifting of the film to occur due to differences in elevation between articles, meaning that it can be difficult to maintain satisfactory shape followability of the film at the ends of the articles.

Therefore, one object of the present invention can include providing a film-forming apparatus capable of film lamination with superior evenness and good followability regardless of the size, shape, and number of articles being laminated in a process for laminating a film on an article using a vacuum forming apparatus, and a film-forming method using this film-forming apparatus.

A film-forming apparatus according to an aspect of the present invention has a first chamber that is provided with a heating means and that is capable of maintaining a vacuum or a pressurized state, a second chamber that is disposed so as to be able to be joined to, and separated from, the first chamber, that is provided with a movable supporting table on which an article is supported, and that is capable of maintaining a vacuum or a pressurized state, a frame-like film holding member that is disposed between the first chamber and the second chamber that holds a film, and an auxiliary film pressing tool having a film pressing part that inhibits lifting of the film when the film is laminated on the surface of the article.

An auxiliary film pressing tool according to another aspect of the present invention is attached to a film-forming apparatus having a first chamber that is provided with a heating means and that is capable of maintaining a vacuum or a pressurized state, a second chamber that is disposed so as to be able to be joined to, and separated from, the first chamber, that is provided with a movable supporting table on which an article is supported, and that is capable of maintaining a vacuum or a pressurized state, and a frame-like film holding member that is disposed between the first chamber and the second chamber and that holds a film, and this auxiliary film pressing tool is attached to a bottom of the first chamber or the film holding member, and has a film pressing part that inhibits lifting of the film when the film is laminated on the surface of the article.

A film-forming method according to a further aspect of the present invention has a step of separating a first chamber that is provided with a heating means and that is capable of maintaining a vacuum or a pressurized state from a second chamber that is capable of maintaining a vacuum or a pressurized state, so as to obtain an open state at atmospheric pressure, a step of attaching an auxiliary film pressing tool either to a bottom of the first chamber or between the first chamber and the second chamber, a step of holding a film between the first chamber and the second chamber, a step of forming independently an enclosed region in both the first chamber and the second chamber with the film, a step of forming a vacuum in both the first chamber and the second chamber, and a step of pressurizing only the first chamber to atmospheric pressure or higher, moving a supporting table in the second chamber towards the first chamber, and partially pressing the film by means of the pressure difference between the chambers and the auxiliary film pressing tool so as to laminate the film on the surface of a single article or a plurality of articles.

According to the film-forming apparatus, auxiliary film pressing tool and film-forming method of the present invention, it is possible to effectively inhibit lifting of the film by means of the auxiliary film pressing tool and thereby increase the yield in a process for laminating a film on an article using a vacuum forming apparatus. In addition, it is possible to achieve film lamination with superior evenness and good followability regardless of the size of the chamber and the size, shape, and number of articles being laminated. Furthermore, in cases where a plurality of articles is supported in a chamber, because it is possible to reduce the distance between the articles, it is possible to increase the number of articles able to be placed in the chamber and therefore further increase productivity.

DETAILED DESCRIPTION OF PREFERRED EMBODIMENTS

A mode of an embodiment of the present invention will now be explained by referring to the drawings.

Figure 1A:
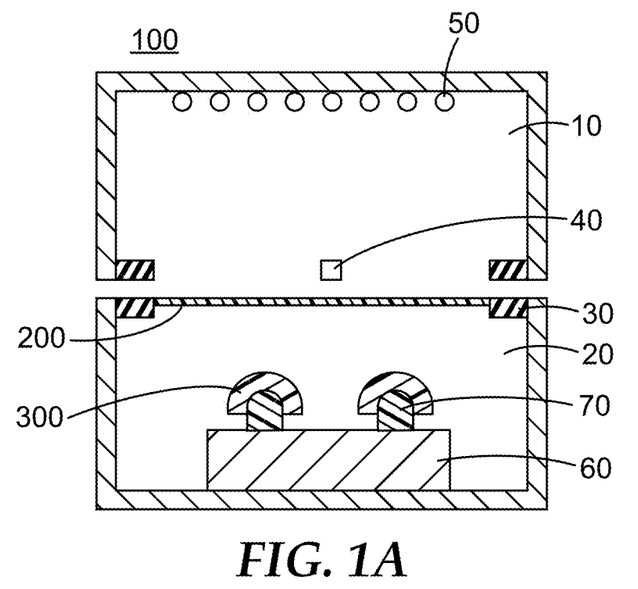
FIGS. 1A and 1B show conceptual cross-sectional views of an embodiment of the film-forming apparatus of the present invention.
Figure 1B:
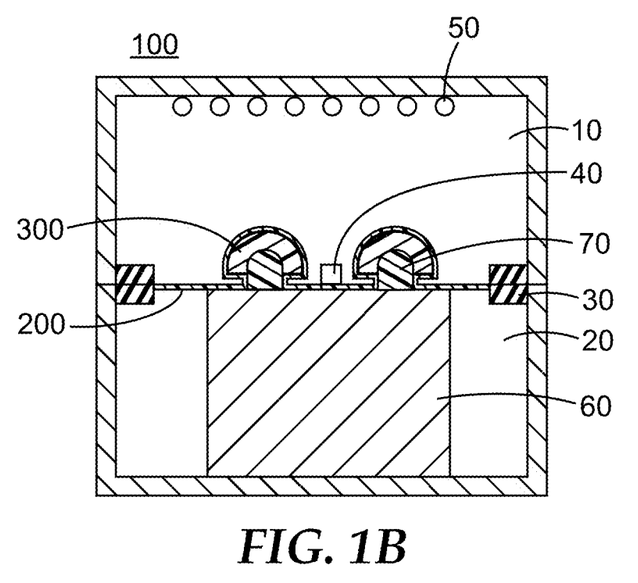

Conceptual cross-sectional views of a mode of an embodiment of the film-forming apparatus of the present invention (called "the present embodiment" hereinafter) are shown in FIG. 1A and FIG. 1B. FIG. 1A shows the state of the film-forming apparatus when articles are placed therein, and FIG. 1B shows the state of the film-forming apparatus when a film is laminated on the articles.

As shown in these diagrams, the film-forming apparatus (100) of the present embodiment has a first chamber (10) capable of maintaining a vacuum or a pressurized state at atmospheric pressure or higher and a second chamber (20). The first chamber (10) and the second chamber (20) are disposed so as to face each other, at least one of the chambers can be moved by an external driving mechanism, and the chambers can be joined together so as to form an enclosed state and separated from each so as to form an open state. Moreover, the orientation of the first chamber (10) and the second chamber (20) is not restricted. For example, the first chamber (10) and the second chamber (20) may be disposed as an upper and a lower chamber, as shown in FIG. 1A, or as a left and a right chamber.

A frame-like film holding member (30) is disposed between the first chamber (10) and the second chamber (20), and a film (200) to be laminated on articles (300) is held by this film holding member (30).

A heating means (50) for heating the film (200) is provided in the first chamber (10), and a supporting table (60) for supporting the articles (300) is provided in the second chamber (20). The supporting table (60) can be moved towards the first chamber (10) so as to raise up the articles. If necessary, the articles (300) are immobilized on pedestals (70) designed according to the shape of the articles and are disposed on the pedestals (70) and the supporting table (60).

One of the main features of a film-forming apparatus of the present invention is the inclusion of an auxiliary film pressing tool that comprises one or more film pressing parts. The auxiliary film pressing tool can be integrated with, or removably attached to, either the bottom of the first chamber or the film holding member. When the film is laminated on an article, the auxiliary film pressing tool inhibits lifting of those parts of the film susceptible to lifting (i.e., those film parts that would lift if not for the use of the tool) by having the film pressing part or parts press the susceptible parts of the film against a support surface (e.g., a support table) on which the article is disposed. The auxiliary film pressing tool should have sufficient rigidity to press the sheet-like film against the support surface.

The shape of the auxiliary film pressing tool is not particularly limited and can be set according to the film lifting condition and can depend on a variety of conditions such as, for example, the size, shape, number, and inter-article distance of the articles on which the film is to be laminated, the size of the film being laminated, and the size of the chambers. For example, the auxiliary film pressing tool can include a film pressing part in the shape of a bar, rod, plate, pin, post, ridge, fin, etc dimensioned as desired. It is possible to form a pressure sensitive adhesive layer on the surface of the auxiliary film pressing tool that comes into contact with the film. In such cases, the film is adhesively supported on the auxiliary film pressing tool by the pressure sensitive adhesive layer, and it is possible to inhibit sagging in the central part of the film caused by the film's own weight.

Here, one of the main features of the film-forming apparatus (100) of the present embodiment is that an auxiliary film pressing tool (40) is attached thereto. The auxiliary film pressing tool (40) can be integrated with, or removably attached to, either the bottom of the first chamber (10) or the film holding member (30). When the film (200) is laminated on the articles (300), this auxiliary film pressing tool (40) inhibits lifting of the film by having a film pressing part that presses a part of the film (200).

Moreover, "film lifting" or "lifting" of the film means a state whereby, when a film is laminated on an article, the film does not satisfactorily follow the surface of the article or the shape of the pedestal and comes away from the surface of the article. Because fin-like floating occurs on the article or the surrounding pedestal or supporting table, in many cases this is also referred to as "the occurrence of fins" in the present specification.

As shown in FIG. 1A, if a plurality of articles (300) is disposed on the supporting table (60) in the second chamber (20), the film pressing part of the auxiliary film pressing tool (40) can be disposed at a position corresponding to a gap between the articles (300). The auxiliary film pressing tool (40) should be a member having sufficient rigidity to press the sheet-like film (200), and the shape of the auxiliary film pressing tool is not particularly limited. The shape of the auxiliary film pressing tool (40) is set according to the film lifting condition and on the basis of a variety of conditions, such as the size, shape, number, and inter-article distance of the articles (300) on which the film (200) is to be laminated, the size of the film being laminated, and the size of the chambers.

By using the auxiliary film pressing tool (40), it is possible to inhibit film lifting and thereby enable film lamination having a high degree evenness and of followability to the shape of the surface of an article.

In addition, because the followability of the film generally deteriorates as the distance between the articles decreases when a plurality of articles is placed in the same chamber, lifting occurs more easily, but by using the auxiliary film pressing tool (40), it is possible to reduce the distance between articles. Because it is possible to place a higher number of articles in the chamber, it is possible to increase productivity.

It is possible to form a pressure sensitive adhesive layer on the surface of the auxiliary film pressing tool (40) that comes into contact with the film (200). In such cases, the film (200) is adhesively supported on the auxiliary film pressing tool by the pressure sensitive adhesive layer, and it is possible to inhibit sagging in the central part of the film caused by the film's own weight.

Moreover, it is possible to use a common commercially available vacuum forming apparatus as a film-forming apparatus not having an auxiliary film pressing tool. For example, it is possible to use a vacuum forming machine manufactured by Fu-se Vacuum Forming. The auxiliary film pressing tool can be attached to a frame member having an opening and is provided on the bottom of the first chamber of these vacuum forming apparatuses either mechanically or by means of an adhesive or the like. This method of attachment is not restricted. It is preferable to dispose the auxiliary film pressing tool in a removable manner so that a suitable auxiliary film pressing tool can be attached for each article used.

A film-forming process using the film-forming apparatus of the present embodiment will now be explained by referring to the conceptual perspective views of the apparatus shown in FIGS. 2A through 3B. Moreover, the diagrams show examples in which an axially shaped auxiliary film pressing tool (41) is used and also show examples in which a film is laminated on hypothetical articles (310) based on an interior component of an automobile.

Figure 2A:
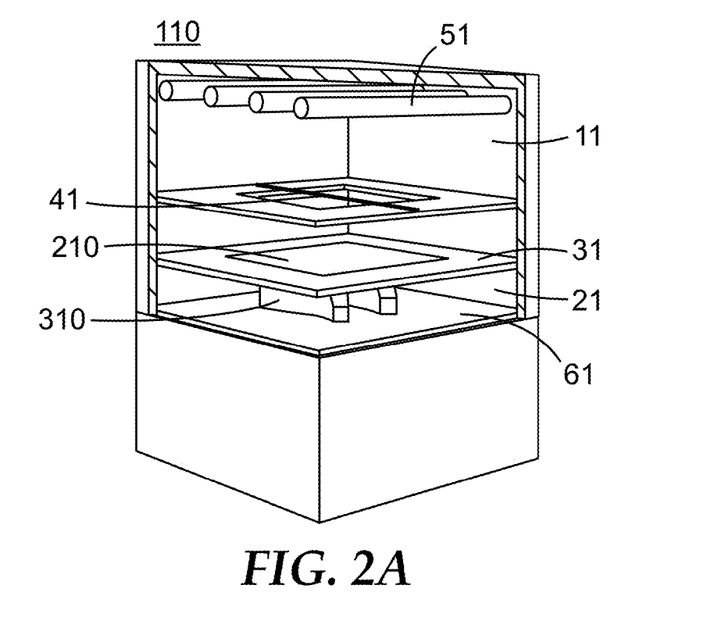
FIGS. 2A and 2B show perspective views of a film-forming apparatus during each step to explain a film lamination process using an embodiment of the film-forming apparatus of the present invention.

First, with the first chamber and the second chamber of the film-forming apparatus (110) open to the atmosphere as shown in FIG. 2A, articles (310) to be laminated are placed on a supporting table (61) in the second chamber (21) and a sheet-like film (210) to be laminated on the articles (310) is placed on the film holding member (31).

However, the auxiliary film pressing tool (41) is placed on the bottom of a frame having an opening in the first chamber (11). For example, the axis of the auxiliary film pressing tool (41) is disposed so as to bisect the approximate center of the opening. This disposition corresponds to the approximate center of the gap between the two articles (310).

FIGS. 2A to 3B, show an example in which the supporting table (61) is the entire bottom surface of the second chamber, but the shape and size thereof is not particularly restricted. The articles (310) may be placed directly on the supporting table (61), but may be immobilized on pedestals (not shown) prepared according to the shape of the articles (310) if necessary. Here, two articles (310) are placed on the supporting table (61), but the number of articles is not particularly restricted.

As mentioned hereafter, the film (210) held by the film holding member (31) is preferably one able to be stretched to at least 150 to 200%, and even 300%, by being heated.

Figure 2B:
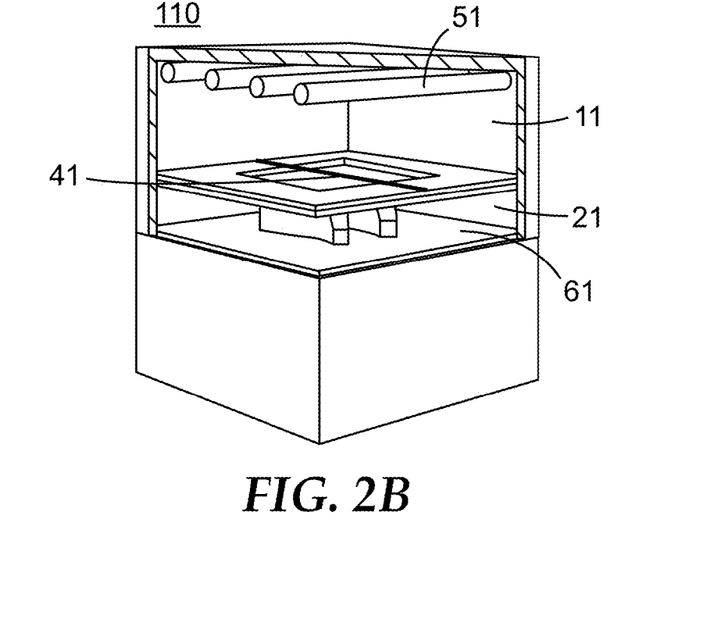

Next, as shown in FIG. 2B, the whole of the second chamber (21) is moved upwards using an external driving mechanism (not shown), the first chamber (11) and the second chamber (21) are closed via the film (210) so as to form an upper chamber and a lower chamber, and each chamber is subjected to vacuum drawing so as to form a vacuum (for example, 1 kPa or lower) in each chamber. In addition, a heating means (51) provided on the ceiling of the first chamber (21) is turned on so as to heat the film (210). Moreover, the heating means (51) is not particularly restricted, but in order to be able to heat efficiently even in a vacuum, the heating means is preferably one able to use radiation heat, for example an infrared lamp heater.

Figure 3A:
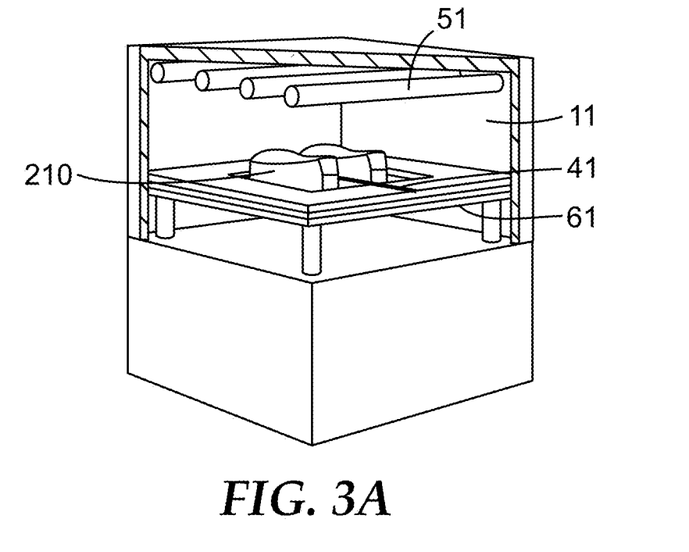
FIGS. 3A and 3B show perspective views of a film-forming apparatus during each step to explain a film lamination process using an embodiment of the film-forming apparatus of the present invention.

Next, as shown in FIG. 3A, the supporting table (61) in the second chamber (21) is gradually pushed upwards while the film (210) is being heated, and the supporting table (61) is moved so that the articles (210) move from the opening on the bottom of the first chamber to a position at which almost the whole of the articles are beyond the bottom of the first chamber.

The film (210) is able to be stretched by being heated by the heating means (51). The film heating temperature is not particularly restricted, and can be adjusted to not lower than 80° C. and not higher than 200° C., or not lower than 90° C. and not higher than 180° C., according to the film being used and the degree of stretching required, for example approximately 120° C. As the articles (210) move by being pushed upwards, the stretchable film is stretched by coming into contact with the surface of the articles and is pressed by the axially shaped auxiliary film pressing tool (41) disposed at a location exactly in the gap between the two articles.

In this state, the first chamber alone is pressurized to a suitable pressure (for example, atmospheric pressure to 2 MPa). Due to the pressure difference between the first chamber (11) and the second chamber, the film (210) follows and closely adheres to the concavoconvex shape of the exposed surface of the articles (310), thereby laminating the surface of the articles. Meanwhile because the film in the gap between the two articles is pressed by the axially shaped auxiliary film pressing tool (41), lifting of the film in this gap is inhibited.

Figure 3B:
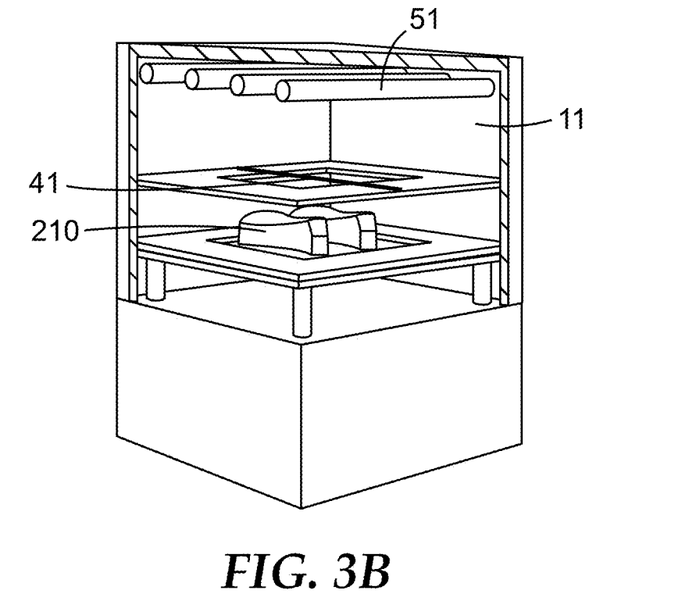

Next, as shown in FIG. 3B, the first chamber (11) and the second chamber (21) are opened once more and returned to atmospheric pressure, and the articles (310) on which the film (210) is laminated are able to be removed to the outside. Unwanted parts, such as the edges, of the film (310) adhered to the surface of the articles are then trimmed.

Figure 4A:
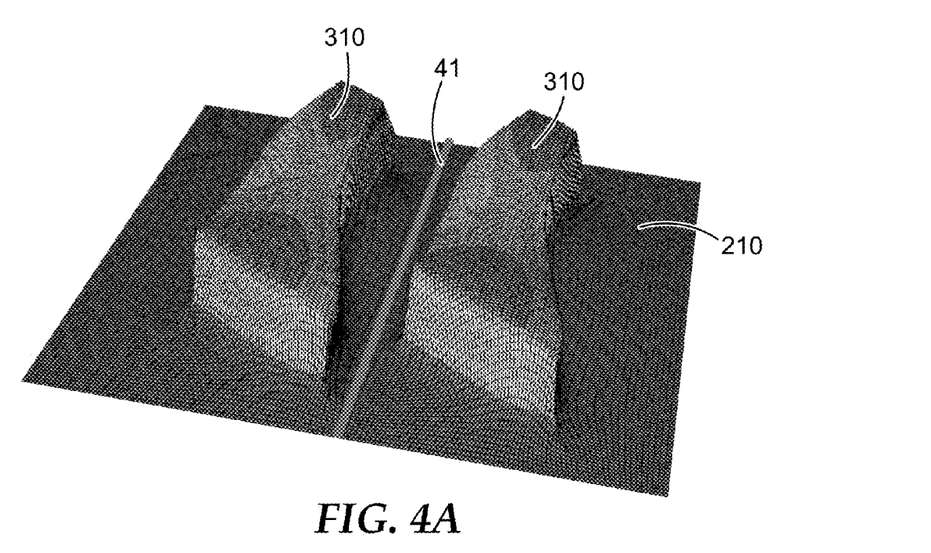
FIG. 4A is a diagram showing a state in which a film is laminated on an article by using a film lamination process using an embodiment of the film-forming apparatus of the present invention.
Figure 4B:
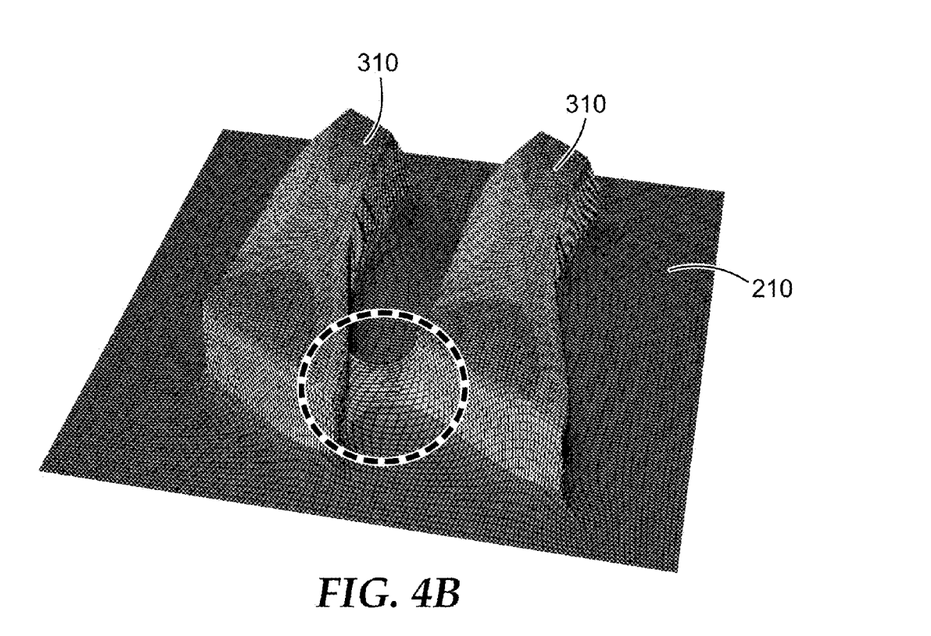
FIG. 4B is a diagram showing a state in which a film is laminated on an article by using a film lamination process using a conventional film-forming apparatus without using an auxiliary film pressing tool.

The effect of the auxiliary film pressing tool will now be explained in greater detail by referring to FIGS. 4 and 5. FIG. 4A is a simulation-visualized perspective view of a state in which a film is laminated on two articles (310) and which is formed by a film lamination process using the above-mentioned film-forming apparatus of the present embodiment in which the auxiliary film pressing tool (41) of the present embodiment is used, and FIG. 4B is a simulation-visualized perspective view of a laminated film state in which a film is laminated under the same conditions except that the auxiliary film pressing tool (41) is not used.

Moreover, the conditions used in this simulation are as follows.

1) Article conditions: Two automobile door parts were used. The maximum height was 70 mm when using almost the same articles as the conditions in the working example mentioned below, wherein the articles had a maximum width of approximately 70 mm, a maximum length of approximately 205 mm and a height of approximately 33 mm, and were placed on a pedestal. The two door parts were disposed in the same orientation on the supporting table so that the long axes that pass through the center of gravity of the articles were parallel, and the minimum distance between the two door parts was 25 mm.

2) Film conditions: The film area was 260 mm×260 mm and the film temperature during the lamination was 120° C. The coefficient of thermal expansion of the film was 10-5/° C., the elastic modulus of the film at the film lamination temperature was 19.4 MPa, the Poisson's ratio was 0.45 and the yield stress was 0.53 MPa.

3) Auxiliary film pressing tool conditions: An axially shaped member having a cross sectional diameter of 2 mm was disposed in the approximate center of the gap between the two articles.

According to the results of the simulation, in cases in which the auxiliary film pressing tool (41) was not used lifting of the film readily occurred, especially on the ends of the two articles (310), and film lifting such as inter-article "fins" ultimately occurred, as shown at a circle drawn by a broken line in FIG. 4B.

However, as shown in FIG. 4A, according to the results of the simulation, in cases in which the film was laminated on the articles using the above-mentioned film-forming apparatus of the present embodiment in which the auxiliary film pressing tool (41) of the present embodiment was used, it was possible to confirm that almost no "fins" occurred due to lifting of the film in cases where the distance between the two articles was also 25 mm.

Because it is possible to effectively inhibit film lifting (which readily occurs in interarticle spaces when laminating a plurality of articles) by using the auxiliary film pressing tool (41) of the present embodiment in this way, it is possible to reduce the gap between the articles. Therefore, because it is possible to place a higher number of articles in a single chamber, it is possible to greatly improve film lamination productivity.

Figure 5:
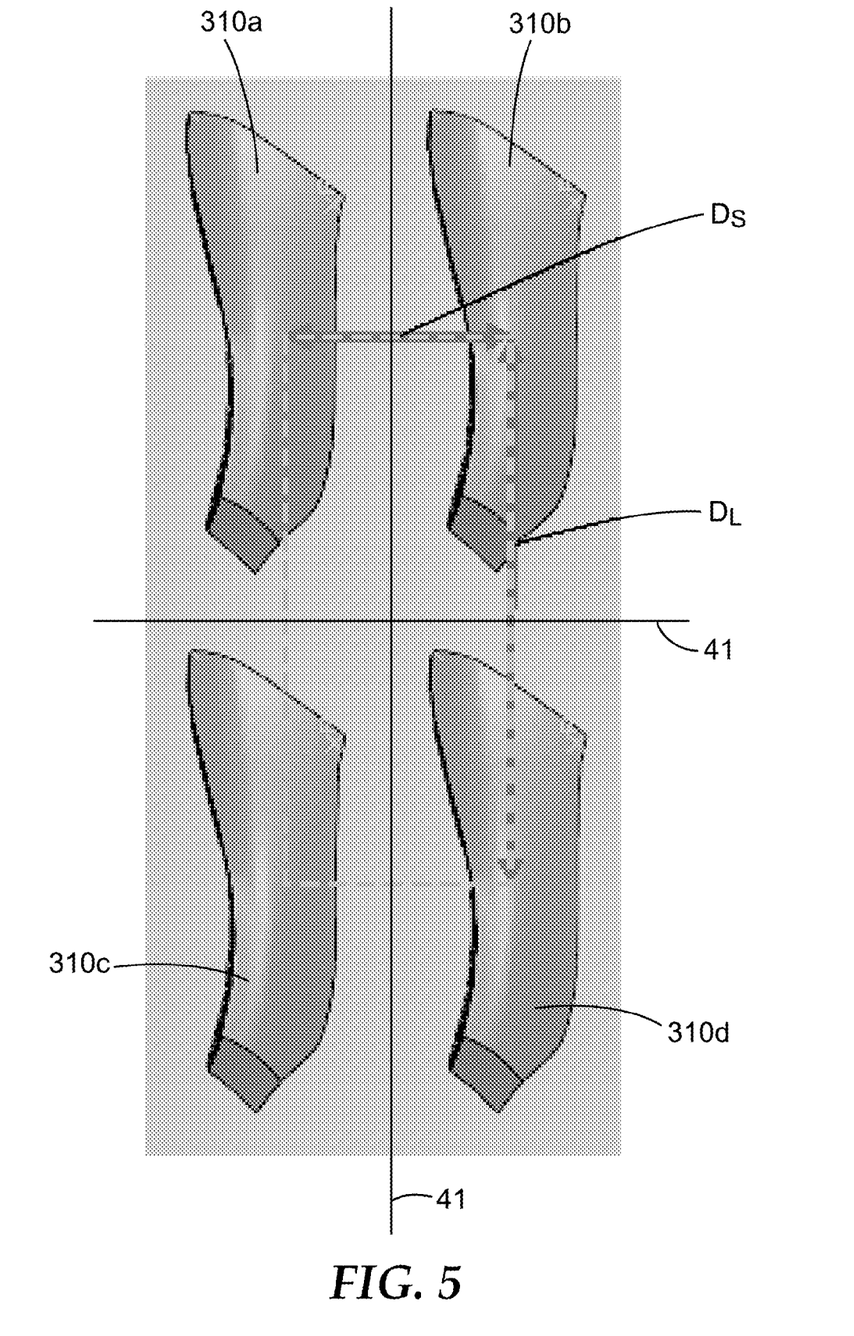
FIG. 5 is a plan view showing a state in which a plurality of articles is arranged in an embodiment of the present invention.

For example, in a case in which four articles (310a to 310d) are evenly distributed on a supporting table, as shown in FIG. 5, the pitch (Dl) in the long axis direction and the pitch (Ds) in the short axis direction that pass through the center of gravity of each article are such that the inter-article pitch (Dl) must be at least 106 mm or greater and the inter-article pitch (Ds) must be 253 mm or greater in order to inhibit film lifting if the auxiliary film pressing tool (41) of the present embodiment is not used. However, in cases where an axially shaped auxiliary film pressing tool (41) is disposed in the approximate center of the gap between the articles in both the long axis direction and the short axis direction, the inter-article pitch (Dl) can be reduced to 91 mm and the inter-article pitch (Ds) can be reduced to 223 mm while still inhibiting film lifting. In other words, it is possible to increase the disposition efficiency by 24% in cases where, for example, four articles are disposed as shown in FIG. 5. In cases where a large number of articles are placed in a single chamber, it is possible to increase the number of articles by using the auxiliary film pressing tool (41).

Moreover, in cases where the number of articles in a single chamber is further increased, by disposing auxiliary film pressing tools in the approximate center of the gaps between the articles, it is possible to inhibit film lifting, improve the followability of the film to the surface of the articles, and therefore unify the state of lamination on the articles.

Moreover, in a simulation model in which a cuboid having a height (H), a width (W) and a length (L) is used as an article and two articles having the same shape are disposed parallel to each other in the long axis direction thereof at an inter-article distance (D), because the occurrence of fins due to film lifting was significant if the ratio of the inter-article distance (D) to the height of the article (H) (D/H) is small or if the ratio of the length of the article (L) to the height of the article (H) (L/H) is small, using auxiliary film pressing tools increases the fin inhibition effect.

Furthermore, the auxiliary film pressing tool may be provided with a pressure sensitive adhesive layer on the surface that comes into contact with the film so as to hold the film on the pressure sensitive adhesive layer. When laminating the surface of an article, because the film is softened by being heated, the central part of the film can sag under its own weight. In particular, increasing the area of the chamber in order to increase productivity, causes significant sagging in the center of the film due to gravity, meaning that the difference in lamination conditions between the center and the edges of the film grows large. Because differences in lamination conditions from location to location also bring about differences in the stretchability of the film, it is difficult to achieve uniform decoration in some locations in cases where a decorative film is to be laminated. The pressure sensitive adhesive layer provided on the auxiliary film pressing tool holds the film and prevents the film from sagging, thereby enabling a more uniform state of lamination.

Moreover, the pressure sensitive adhesive film used in such cases is not particularly restricted, but it is possible to use a commonly used adhesive such as an acrylic, polyester-based, urethane-based, rubbery, or silicone-based adhesive. Of these, it is preferable to use an adhesive having a heat resistance that can withstand the heating conditions used in the lamination process, such as 120° C. or higher, 150° C. or higher, or 180° C. or higher. For example, the use of an acrylic pressure sensitive adhesive is preferred. The pressure sensitive adhesive layer can be formed using a variety of coating methods, but it is possible to use a pressure sensitive adhesive layer used in commercially available double-sided sticky tapes and apply this layer to the pressing surface of the auxiliary film pressing tool.

Furthermore, the auxiliary film pressing tool may be provided with a thermal sensor. As the auxiliary film pressing tool can contact a film, temperature of the film can be measured more correctly, and therefore heating conditions of the film can be controlled more accurately.

FIG. 3 and FIG. 4 show examples of auxiliary film pressing tools having axially shaped film pressing parts, but as long as it is possible to effectively inhibit film lifting according to the shape, number, disposition, and so on of the articles being used, the shape of the auxiliary film pressing tool is not restricted. In addition, the auxiliary film pressing tool can be effectively used whether laminating a plurality of articles or just a single article. Therefore, the auxiliary film pressing tool is preferably designed according to the specific film lamination conditions.

Figure 6:
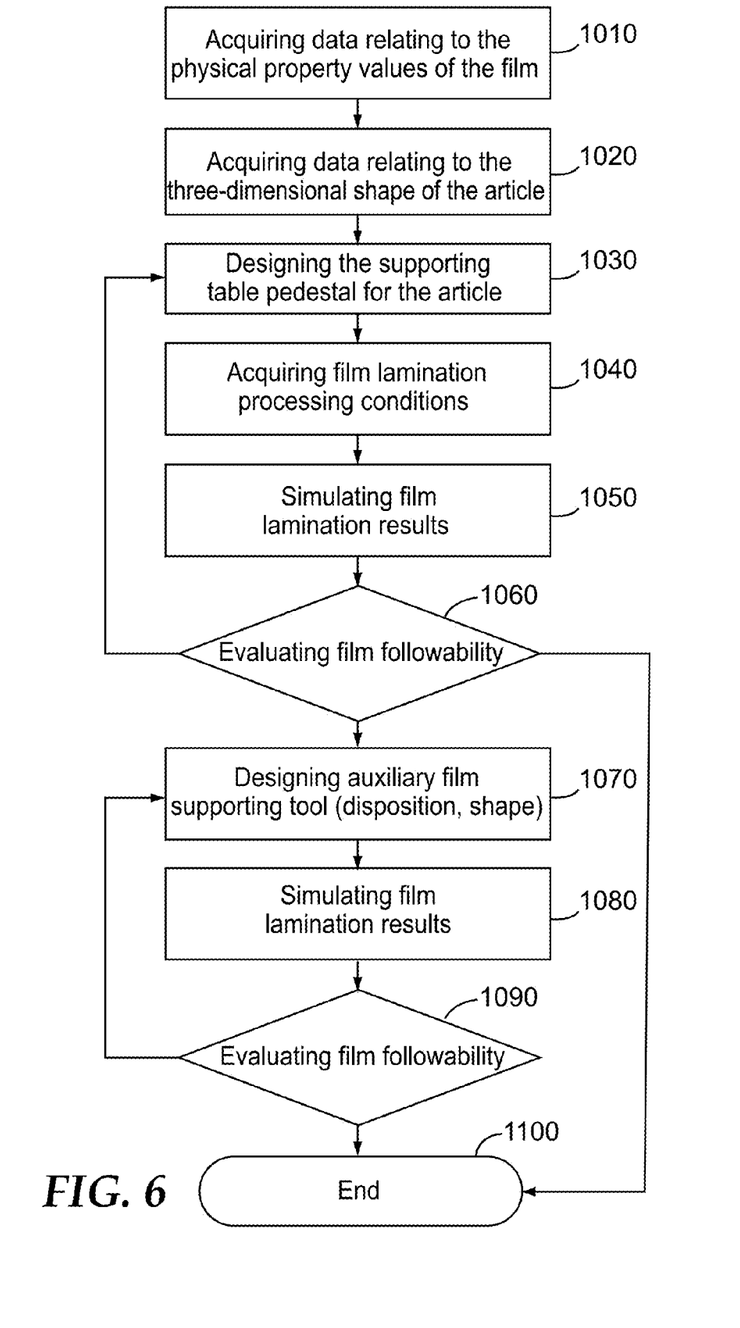
FIG. 6 is a flow chart showing an example of the process for designing an embodiment of the auxiliary film pressing tool of the present invention.

FIG. 6 is a flow chart showing an example of the process for designing the shape and disposition of an auxiliary film pressing tool. By means of a simulation, the state of film lamination when not using an auxiliary film pressing tool is first understood, from which it is possible to identify regions in which film lifting can readily occur. Based on the results of this simulation, it is possible to decide upon the shape of the auxiliary film pressing tool.

Computational methods used in such simulations can be, for example, finite element methods, and more specifically an explicit method, which is a type of finite element method. For example, it is possible to carry out simulations by using Abaqus, which is commercially available proprietary simulation software sold by Simulia that carries out finite element analysis.

A specific simulation will now be carried out according to the procedure shown in FIG. 6. Firstly, data relating to the physical properties of the film, which is essential for the simulation, is acquired (1010). These physical property values include data relating to the stretchability of the film under the film lamination conditions, which is obtained from tensile tests or viscoelasticity tests.

Next, data relating to the three-dimensional shape of the article to be laminated is acquired (1020). This data is usually acquired as 3D CDA data for the article. Moreover, in cases in which the article is a small component having a complex shape (having small holes or protrusions and so on), it is acceptable to simplify data relating to the shape of the article because this has little effect on the simulation results but complicates the computations. In addition, in cases where the article is constituted by many components, it is acceptable to treat these components together as a single article.

Next, a pedestal for immobilizing the article is designed (1030). The pedestal is designed according to the shape of the article. The design of the pedestal is based on the shape, size, and height of the article, the immobilization angle of the article, the number of articles, the positional relationship of the pedestal to the article, and is also based on data not relating to the shape of the article, such as the concavoconvex shape of the pedestal itself.

Next, the film lamination process conditions are acquired (1040). Here, the process conditions include the size of the film being laminated on the article (the size of the frame of the film holding member in the vacuum forming apparatus), the film heating temperature during lamination, and the speed at which the supporting table in the second chamber is raised.

On the basis of the data acquired above, a simulation is carried out into the state of the film laminated on the article (1050).

Based on the results of the simulation, an evaluation is carried out into the followability of the laminated film to the shape of the surface of the article (1060). Specifically, an evaluation is carried out as to whether the stretching of the laminated film goes beyond the degree of stretching at which film breakage is possible and also as to whether film breakage is possible due to localized extreme stretching in places. If it appears as a result of these evaluations that good film lamination can be carried out, the design process is ended (1100), but if the film lamination evaluation results indicate that the shape of the pedestal needs to be changed, the pedestal shape design is reevaluated (1040).

When the pedestal shape design process is complete, another film lamination simulation is carried out on the basis of this data (1050) and the film lamination followability is evaluated once more (1060). Next, the auxiliary film pressing tool is designed on the basis of these results in order to inhibit lifting of the film that cannot be addressed merely by changing the design of the pedestal (1070). In other words, the shape, size, disposition, and so on of the auxiliary film pressing tool are designed.

Data for the designed auxiliary film pressing tool is added and a simulation of the film lamination results is carried out once more (1080). From the results of this simulation, an evaluation into the followability of the laminated film is carried out (1090), and in cases where satisfactory film followability is not achieved, the auxiliary film pressing tool is designed again. The evaluation (1090) and the design of the auxiliary film pressing tool (1070) are repeated if necessary in order to establish the shape of the auxiliary film pressing tool. Furthermore, if it is possible to confirm from the simulation of the film lamination results (1080) and the evaluation (1090) that good film followability is possible, the design process is ended.

Figure 7A:
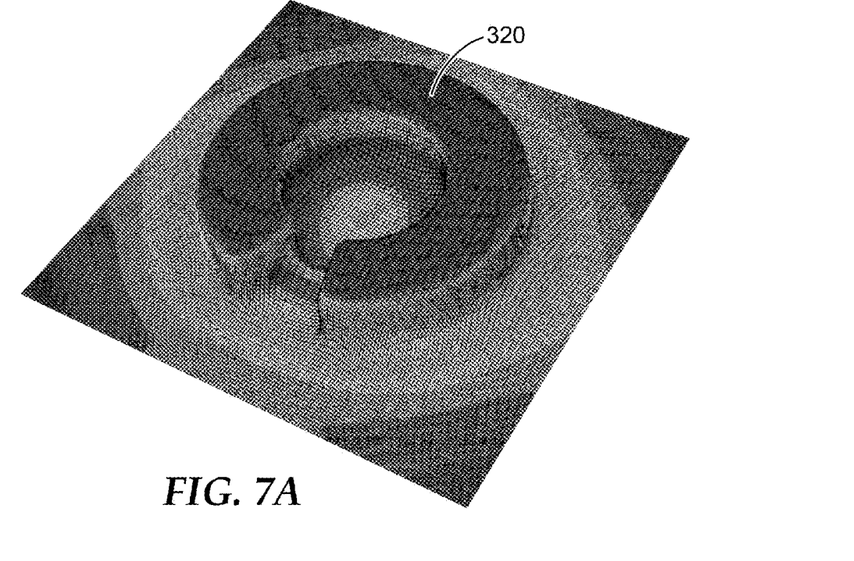
FIG. 7A is a perspective view showing a state in which a film is laminated on a different type of article without using a corresponding auxiliary film pressing tool in an embodiment of the present invention.
Figure 7B:
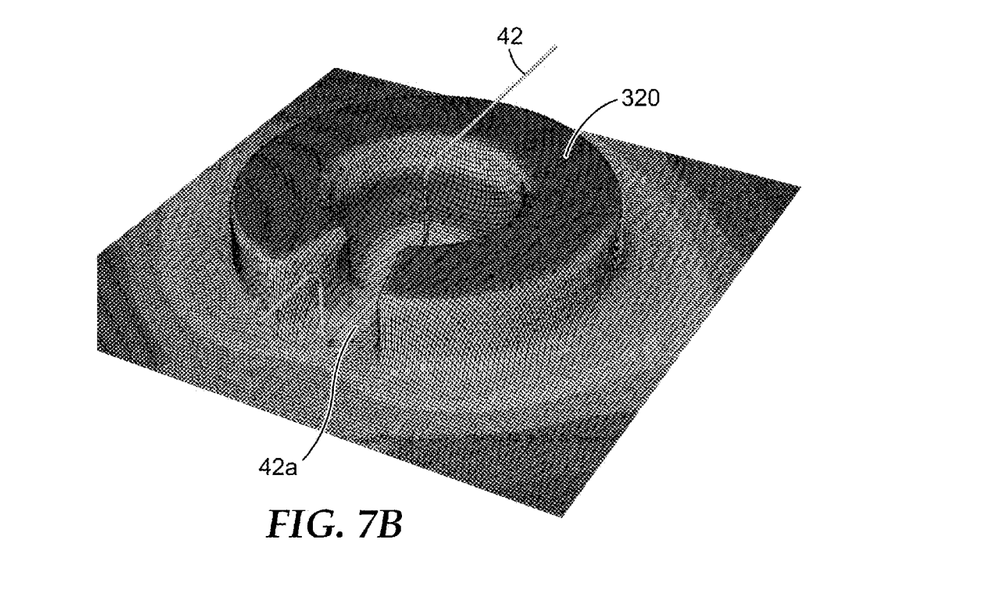
FIG. 7B is a perspective view showing a state in which a film is laminated on a different type of article using a corresponding auxiliary film pressing tool in an embodiment of the present invention.
Figure 8A:
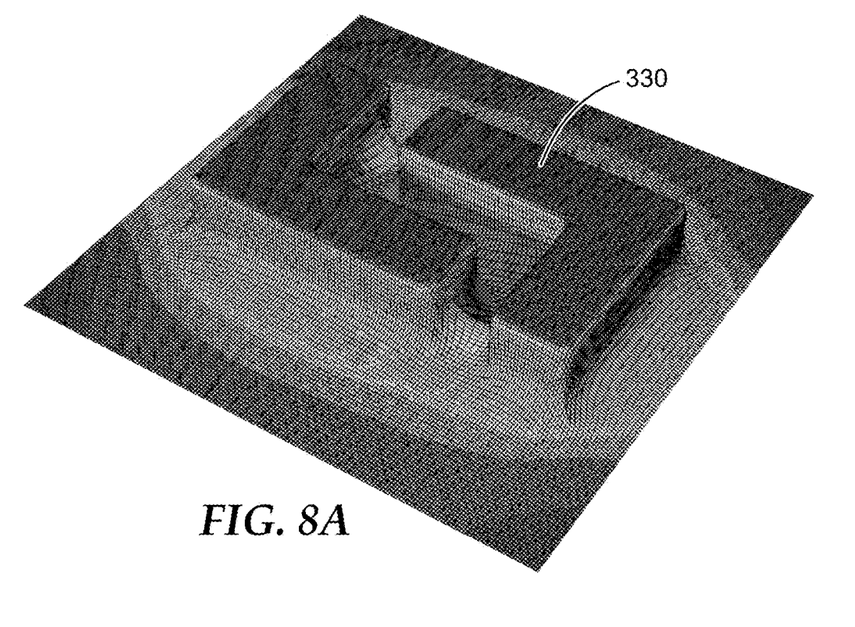
FIG. 8A is a perspective view showing a state in which a film is laminated on a different type of article without using a corresponding auxiliary film pressing tool in an embodiment of the present invention.
Figure 8B:
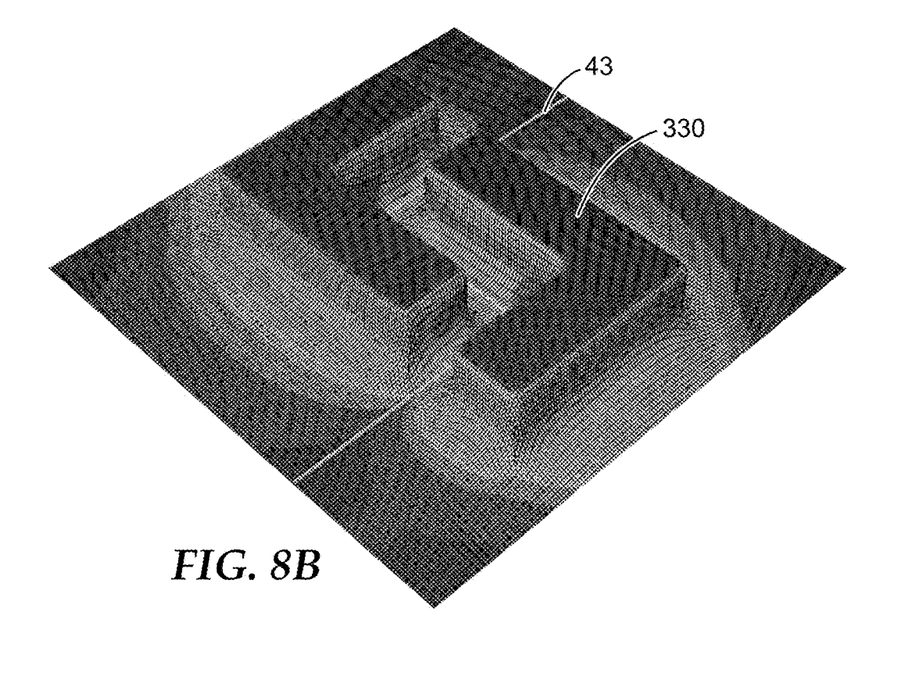
FIG. 8B is a perspective view showing a state in which a film is laminated on a different type of article using a corresponding auxiliary film pressing tool in an embodiment of the present invention.

FIG. 7 and FIG. 8 show examples of different articles and examples of the results of film lamination simulations carried out using auxiliary film pressing tools for these articles. FIG. 7A shows the results of a film lamination simulation in a hypothetical case in which a film is laminated on a single article (320) having a shape in which a part of a ring is missing. It is understood that film lifting occurs in parts of articles having a shape in which a part of a ring is missing. An auxiliary film pressing tool for this article can be a three-dimensionally shaped auxiliary film pressing tool (42) having a film pressing part (42a) for only the missing part of the ring. FIG. 7B shows the results of a film lamination simulation in which the auxiliary film pressing tool (42) is used. It was understood that it is possible to effectively inhibit lifting of the film.

In this way, it is possible to use an auxiliary film pressing tool having a film pressing part (42a) for only this part in cases where partial film lifting occurs due to the shape of even a single article. In addition, the shape of the auxiliary film pressing tool (42) can be a variety of shapes according to the shape of the article.

FIG. 8A shows the results of a film lamination simulation for a case in which two L-shaped articles are disposed in a rotationally symmetrical manner, and FIG. 8B shows the results of a film lamination simulation for a case in which an auxiliary film pressing tool (43) having a clamp shape is used in accordance with the shape of the gap between the two articles. It was understood that it is possible to effectively inhibit lifting of the film between the articles.

In the examples given above, an auxiliary film pressing tool is obtained by processing an axially shaped member according to the shape of the article or the shape of the gap between articles, that is, according to the disposition of the article(s), but the auxiliary film pressing tool is not limited to axially shaped members, and can be a band shaped member or a member having a width size or shape that can be changed according to the gap between the articles. In addition, the auxiliary film pressing tool may be obtained by three-dimensionally processing an axially shaped or band shaped member.

The material of the auxiliary film pressing tool may be any rigid material such as a metal, alloy, ceramic or heat-resistant plastic that does not deform at temperatures of not lower than 80° C. and not higher than 200° C., or not lower than 90° C. and not higher than 180° C., which are the heating conditions during the film lamination.

The article and film used in the embodiment of the present invention will now be explained in greater detail.

It is possible to use a variety of objects as the article to be laminated with a film. Typical examples include exterior and interior components for automobiles and decorative components for motorcycles. Specific examples of interior components for automobiles include door grips, switch panels for electric windows, garnishes, steering wheels, gear shift panels, console boxes, drink holders, center consoles, instrument panels, center garnishes, door garnishes, dash boards, scuff plates, and pillars. In addition, examples of exterior components for automobiles include door handles, front grilles, pillars, back doors, pillar garnishes, lamp bezels, moldings, fuel caps, emblems, bumpers, and door mirror covers. Furthermore, examples of decorative components for motorcycles include fenders, shrouds, fuel tanks, fuel tank covers, side covers, middle cowlings, side cowlings, upper cowlings, frame covers, radiator covers, front covers, muffler covers, and side panels.

Furthermore, other articles include domestic appliances, electronic components, and furniture. Further specific examples include veneers for refrigerators, television bodies, veneers for laptop computers, decorative parts for cellular telephones, bodies for personal computers, chairs, desks, shelves, lavatory seat lids, decorative and reflective films applied to helmets, planters, flower pots, reflective films for lighting, lamp shades, suitcases, and musical instruments.

The film used for the lamination is not particularly restricted, and can be a heat-resistant film able to withstand the heating temperature used during the lamination. For example, it is possible to use a single or composite thermoplastic resin such as a polyester such as polyethylene terephthalate (PET), polybutylene terephthalate (PBT) or polyethylene naphthalate (PEN), polyvinyl chloride (PVC), a polycarbonate (PC), an acrylonitrile/butadiene/styrene copolymer (ABS), an acrylonitrile/ethylene-propylene-diene/styrene copolymer (AES), a polyurethane, a poly(meth)acrylate such as poly(methyl methacrylate), or a polyolefin such as polyethylene or polypropylene. Of these, poly(vinyl chloride), polyurethanes, poly(meth)acrylates, polypropylene, polycarbonates, ABS and AES exhibit stretchability during heating and adhesion to an adherend while exhibiting excellent weather resistance properties. Poly(vinyl chloride), polyurethanes, poly(meth)acrylates, and polypropylene are especially suitable.

In general, the film may be a laminate film having a multilayer structure that contains a monolayer or multilayer base film formed by cast molding, extrusion molding, and so on and which optionally contains a printed layer, a metalized film, a pressure sensitive adhesive layer, and so on the base film.

In order to improve the protection, weather resistance properties, strength, and aesthetic appearance of a surface, the base film of the film may be a laminated film formed from the same or different materials.

In addition, for reasons of decoration, the laminated film body may contain a monolayer or multilayer printed layer. The printing may be carried out by using a known method such as screen printing, gravure printing, offset printing, ink jet printing, or electrostatic coating. The printed layer is disposed, for example, between the base film and the pressure sensitive adhesive layer.

In order to impart decorative properties, one or more layers of the film may be subjected to processing such as deposition of one or more metal films of chromium, aluminum, titanium, indium, tin, nickel, stainless steel, silver, gold, copper, or titanium and/or application of a coating that contains powdered metal microparticles. A deposited film of indium or a coating layer of powdered metal microparticles is especially preferred since it does not cause whitening or cracking of the metal film when the film is laminated. The thickness of deposited metal layer or layer containing powdered metal microparticles is not particularly limited, and can be a thickness set according to the intended design and/or the light transmittance, such as between several nanometers and several dozen nanometers.

The film may also contain additives such as plasticizers, antioxidants, UV absorbents, pigments, and fillers.

The thickness of the overall film is not restricted, but it is possible to improve the followability of the film to the shape of the surface of the article if this thickness in approximately 200 µm or less, and especially approximately 100 µm or less. However, from the perspective of protecting the article, the minimum thickness of the film is 50 µm or more, and preferably 80 µm or more, in order to ensure a certain degree of film strength.

The film may contain a pressure sensitive adhesive layer on the surface that comes into contact with the surface of the article. The pressure sensitive adhesive layer may be formed by coating, spraying, and so on. The thickness of the pressure sensitive adhesive layer is not restricted as long as peeling or folding does not occur when the film is laminated and bleeding does not occur at high temperatures. For example, the thickness of the pressure sensitive adhesive layer can be approximately 10 to approximately 50 µm or, in a different mode, approximately 20 to approximately 40 µm.

In cases where the surface of the article is an olefinic resin such as polyethylene or polypropylene, which have a low surface free energy and therefore do not adhere readily, it is possible to incorporate a tackiness-imparting agent such as a tackifier in the pressure sensitive adhesive layer in order to facilitate adhesion.

Moreover, in order to increase the surface free energy of the article being laminated, thereby increasing wettability and improving adhesive strength, it is possible to subject the surface of the article to plasma treatment, corona discharge treatment, and so on. In cases where the surface of the article is an olefinic resin such as polyethylene or polypropylene in particular, such treatments are effective for improving the adhesive strength.

EXAMPLES

A working example of the present invention will now be explained.

Example

A double-sided vacuum forming machine (NGF-0709, manufactured by Fu-se Vacuum Forming) was used as the film-forming apparatus. Two door parts, which were the articles, were placed on pedestals on the supporting table in the second chamber in a rotationally symmetrical manner so that the long axes passing through the centers of gravity of the articles were parallel. The shape of the door parts was almost the same as that used in the simulation shown in FIG. 4A, and the size of each part was such that the maximum width was approximately 70 mm, the maximum length was approximately 205 mm and the height was approximately 33 mm, meaning that the maximum height when placed on the pedestal was 70 mm. The minimum distance between the two door parts was 25 mm.

An iron wire used in wire hangers and having a cross-sectional diameter of 2 mm was prepared as the auxiliary film pressing tool. This was disposed on a frame, which measured 260 mm×260 mm, had an opening and was attached to the bottom of the first chamber of the vacuum forming apparatus, so that the wire passed through the approximate center of the opening, both ends of the wire were bent, and the wire was immobilized by being tied to the frame. In this way, the wire was disposed in a position corresponding to the approximate center of the gap between the two door parts.

Meanwhile, the film was immobilized by the frame-like film holding member. The area of the opening in the film holding member was almost the same as that of the area of the opening of the bottom of the first chamber. The film used was a decorative film having a 7-layer structure as indicated below (ITF1201J produced by Sumitomo 3M Ltd.). The type and thickness of each layer are as indicated below. Moreover, a liner on the reverse side of the film was peeled off at the time of lamination, thereby exposing an acrylic pressure sensitive adhesive layer (the first layer) that comes into direct contact with the surface of the article.

Structure of the Film Used

First layer: Acrylic pressure sensitive adhesive layer, thickness 40 μm
Second layer: Primer layer, thickness 1 μm
Third layer: Urethane layer, thickness 30 μm
Fourth layer: Metal deposition layer, thickness 1 μm
Fifth layer: Urethane pressure sensitive adhesive layer, thickness 15 μm
Sixth layer: Colored transparent acrylic layer, thickness 30 μm
Seventh layer: Transparent acrylic layer, thickness 30 μm Using the procedure explained above with reference to FIG. 3, the film was laminated on the articles. In other words, the first chamber and the second chamber were sealed, separate vacuums were drawn in each chamber so that the pressure in each chamber was 1 kPa or lower, and the film was heated to a temperature of approximately 120° C. by an infrared lamp attached to the ceiling of the first chamber. Next, as the supporting table in the second chamber was pushed up, a part of the film was pressed by the wire, which was the auxiliary film pressing tool. The first chamber was then pressurized to a pressure of approximately 2 kPa. In this way, the film was laminated on the surface of the article. Despite the distance between the articles being only approximately 25 mm, it was possible to laminate the film without the occurrence of film lifting (fins).

Comparative Example

By way of a comparative example, film lamination was carried out using a vacuum forming apparatus but without using an auxiliary film supporting tool. The film lamination was carried out using the same conditions as those used in the working example, except that the auxiliary film supporting tool was not used. However, the distance between the articles was set to 40 mm, 45 mm, 50 mm, and 55 mm. When the distance between the articles was 40 mm, significant fin-like film lifting was observed between the articles, and although the height of the film lifting was reduced by approximately half when the distance between the articles was 45 mm, some fins remained. When the distance between the articles was 50 mm, some film lifting remained and it was not possible to achieve complete film followability. In order for almost no film lifting to occur between the articles, it was necessary to increase the distance between the articles to 55 mm.

What is claimed is:

1. A method of laminating a film on a plurality of articles, the method comprising: providing a first chamber capable of maintaining a first vacuum or a first pressurized state; providing a second chamber capable of maintaining a second vacuum or a second pressurized state and having a supporting table disposed therein;
    separating the first chamber from the second chamber so as to obtain an open state at atmospheric pressure;
    disposing a plurality of articles on the supporting table in the second chamber;
    attaching an auxiliary film pressing tool either to a bottom of the first chamber or between the first chamber and the second chamber, the auxiliary film pressing tool having a film pressing part;
    disposing the film pressing part in a position corresponding to a gap zone between articles;
    holding a film between the first chamber and the second chamber;
    forming an enclosed region in both the first chamber and the second chamber with the film respectively;
    forming a first vacuum condition in the first chamber and a second vacuum condition the second chamber;
    heating the film; and
    pressurizing only the first chamber to atmospheric pressure or higher, moving the supporting table in the second chamber towards the first chamber, and partially pressing the film by means of the pressure difference between the chambers and the auxiliary film pressing tool so as to laminate the film on a surface of the plurality of articles, wherein the auxiliary film pressing tool presses a part of the film against the surface of the plurality of articles to inhibit lifting of the film from the surface of the plurality of articles.

2. The method of claim 1, wherein the first chamber and second chamber are disposed as to face each other.

3. The method of claim 2, wherein the first chamber and second chamber are capable of being joined together so as to form an enclosed state and being separated from each other to form the open state.

4. The method of claim 1, wherein the film pressing part inhibits the lifting of the film as the film is being laminated to the surface of the plurality of articles.

5. The method of claim 1, wherein the auxiliary film pressing tool is disposed on the bottom of the first chamber or the film holding member in a removable manner.

6. The method of claim 5, wherein the auxiliary film pressing tool is removably attached to a frame member having an opening, the frame member being provided on the bottom of the first chamber.

7. The method of claim 6, wherein the auxiliary film pressing tool is a first auxiliary film pressing tool and further comprising:
removing the first auxiliary film pressing tool from the frame member; and
attaching a second auxiliary film pressing tool to the frame member based on the plurality of articles to be laminated.

8. The method of claim 1, wherein the film pressing part of the auxiliary film pressing tool comprises a rod-like or band-like rigid member.

9. The method of claim 1, wherein the auxiliary film pressing tool further comprises a pressure sensitive adhesive layer on a portion of a surface of the auxiliary film pressing tool that comes into contact with the film when laminating the film on the surface of the plurality of articles.

10. The method of claim 1, wherein disposing the plurality of articles on the supporting table comprises placing the plurality of articles directly on the supporting table.

11. The method of claim 1, wherein disposing the plurality of articles on the supporting table comprises immobilizing the plurality of articles on respective pedestals located on the supporting table.

12. The method of claim 1, wherein the auxiliary film pressing tool is provided with a thermal sensor to measure the temperature of the film.

13. The method of claim 1, wherein the film comprises a base film and a pressure-sensitive adhesive on the base film, the pressure-sensitive adhesive coming into contact with the surface of the plurality of articles to inhibit sagging of the film under its own weight.

14. The method of claim 1, further comprising opening both the first chamber and the second chamber to atmospheric pressure and removing the plurality of laminated articles.

15. A method of laminating a film on an article, the method comprising:
providing a first chamber capable of maintaining a first vacuum or a first pressurized state; providing a second chamber capable of maintaining a second vacuum or a second pressurized state, and having a supporting table disposed therein;
separating the first chamber from the second chamber so as to obtain an open state at atmospheric pressure;
disposing an article on the supporting table in the second chamber;
attaching an auxiliary film pressing tool in a removable manner either to a bottom of the first chamber or between the first chamber and the second chamber, the auxiliary film pressing tool having a film pressing part;
disposing the film pressing part in a position corresponding to a gap zone within the article;
holding a film between the first chamber and the second chamber;
forming an enclosed region in both the first chamber and the second chamber with the film respectively;
forming a first vacuum condition in the first chamber and a second vacuum condition the second chamber;
heating the film; and
pressurizing only the first chamber to atmospheric pressure or higher, moving the supporting table in the second chamber towards the first chamber, and partially pressing the film by means of the pressure difference between the chambers and the auxiliary film pressing tool so as to laminate the film on a surface of the article, wherein the auxiliary film pressing tool presses a part of the film against the surface of the article to inhibit lifting of the film from the surface of the article.

16. The method of claim 15, wherein the auxiliary film pressing tool is removably attached to a frame member having an opening, the frame member being provided on the bottom of the first chamber.

17. The method of claim 16, wherein the auxiliary film pressing tool is a first auxiliary film pressing tool and further comprising:
attaching a second auxiliary film pressing tool to the frame member based on the article to be laminated.

* * * * *

UNITED STATES PATENT AND TRADEMARK OFFICE
CERTIFICATE OF CORRECTION

PATENT NO. : 10,011,099 B2
APPLICATION NO. : 15/015669
DATED : July 3, 2018
INVENTOR(S) : Takashi Takenouchi

It is certified that error appears in the above-identified patent and that said Letters Patent is hereby corrected as shown below:

Column 8
Lines 21-24, delete "where, for example, four articles are disposed as shown in FIG. 5. In cases where a large number of articles are placed in a single chamber, it is possible to increase the number of articles by using the auxiliary film pressing tool (41)." and insert the same on Column 8, Line 20 as a continuation of the same paragraph.

Column 14
Line 47, in Claim 1, delete "condition" and insert -- condition in --, therefor.

Column 16
Line 22, in Claim 15, delete "condition" and insert -- condition in --, therefor.
Line 40, in Claim 17, below "comprising:" insert -- removing the first auxiliary film pressing tool from the frame member; and --.

Signed and Sealed this
Eighteenth Day of September, 2018

Andrei Iancu
*Director of the United States Patent and Trademark Office*